E. BARTHOLOMEW.
Bee Hive.
No. 26,154.
Patented Nov. 22, 1859.
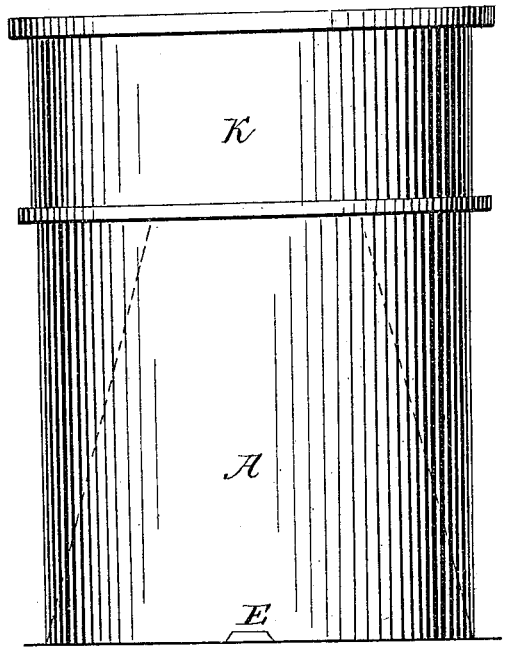
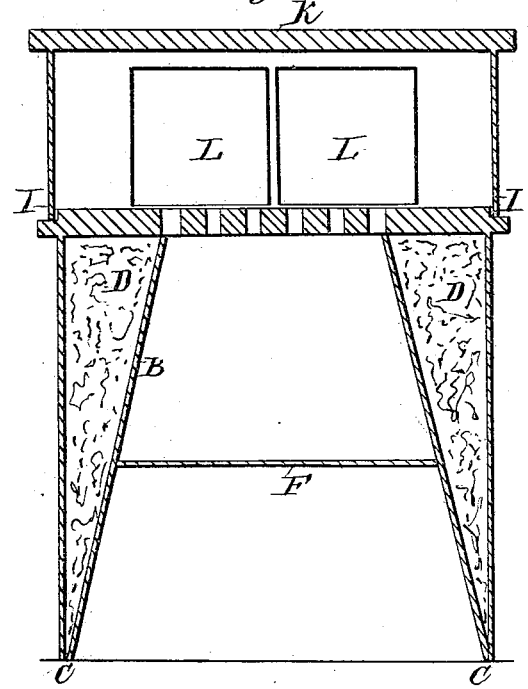
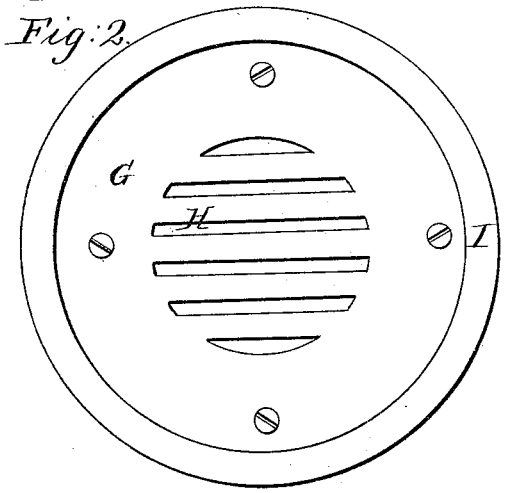

UNITED STATES PATENT OFFICE.

ELI BARTHOLOMEW, OF CLEVELAND, OHIO.

BEEHIVE.

Specification of Letters Patent No. 26,154, dated November 22, 1859.

*To all whom it may concern:*

Be it known that I, ELI BARTHOLOMEW, of Cleveland, in the county of Cuyahoga and State of Ohio, have invented new and useful Improvements in Beehives; and I do hereby declare that the following is a full and complete description of the construction and operation of the same, reference being had to the accompanying drawings, making part of this specification, in which—

Figure 1, is an elevation; Fig. 2 is a transverse section at $x\ x$.: Fig. 3 is a vertical section.

Like letters refer to like parts.

The outside of the hive A, may be square or cylindrical. I prefer the latter form. The inside B, is in form of the frustum of a cone, or pyramid, and placed within the outer portion A, and the lower ends being or nearly equal diameters, should be firmly united as at C, C. The interval space D, D, thus formed between the outside A and inside B, should be packed with pulverized charcoal, saw dust, or other poor conductor of heat. Openings may be left as at E for the entrance of the bees, and bars F, placed across the hive for supporting the comb. The two parts A and B, are made even and level upon the top, and a cover of wood G, nailed upon both, after the packing D, is placed in the space between them. The center of this cover is perforated with openings as seen at H, Fig. 2, for the purpose of allowing the bees to pass from the cone to the space above, and for ventilation. Any convenient form of opening may be used.

The cover G, is rabbeted around the edge as seen at I, for the purpose of receiving the false top K, which incloses the honey boxes L, L, placed over the openings H, in the top of the hive proper. These boxes L can be removed at pleasure, by lifting the false top K, but if the boxes L are removed during the working season, a board or cover should be placed over the orifices H, and the false top K returned to its place. After the working season is passed, the temporary coverings to the openings H, should be left off for ventilation, till spring.

The advantages arising from this improved mode of constructing bee hives may be stated as follows: The upper part of the interior of the hive being small in diameter, enables a small stock of bees to fill the space in cold weather, which excludes the cold air from passing between the bees and the inner casing of the hive. This with the outer casing serves as an effectual protection from cold. Ventilation is obtained by the open spaces H into the false top K without danger of freezing the bees. After the ventilating spaces are closed, which should be soon after the bees reach the top of the hive in winter, its small diameter enables the bees to control their animal heat in a small compass, thereby facilitating the hatching of eggs, raising brood, and producing early swarms. While the bees are working downward in the spring of the year with a large brood and increased numbers, the interior of the hive so increases in size, as to accommodate the largest stocks in their labors when warm weather approaches, and also affords a large bottom ventilation in hot weather the hive being raised from the bottom board for that purpose.

The passages from the hive to the chamber should be kept open in cold weather for ventilation, but should be closed by putting on the boxes with the top down, or with a piece of board, about the first of March, for the purpose of facilitating the hatching and rearing the brood. Boxes should be placed in the chamber for the reception of honey, during the summer season, at any time when the bees collect a surplus beyond the wants of the brood.

The size of the hive should be about eight inches in diameter at the top, and sixteen inches in diameter at the bottom, and about sixteen inches high, exclusive of the chamber which should be about seven inches high. The top, or chamber should be a little larger in diameter than the bottom upon the outside. The interior contents of a hive should be from 1800, to 2000, cubic inches.

What I claim as my improvement and desire to secure by Letters Patent, is—

The arrangement of the outer casing A and the inner casing B, in relation to each other, and the ventilating openings H, in cover G, which cover is furnished with top K, and boxes L, L, in the manner, and for the purposes herein specified.

ELI BARTHOLOMEW.

Witnesses:
J. BRAINERD,
W. H. BURRIDGE.